(12) United States Patent
Ramstack

(10) Patent No.: US 6,466,688 B1
(45) Date of Patent: Oct. 15, 2002

(54) APPARATUS AND METHOD FOR DETECTING AND IDENTIFYING ORGANISMS, ESPECIALLY PATHOGENS, USING THE AURA SIGNATURE OF THE ORGANISM

(76) Inventor: Thomas P. Ramstack, 816 Easley St. #407, Silver Spring, MD (US) 20910

( * ) Notice: Subject to any disclaimer, the term of this patent is extended or adjusted under 35 U.S.C. 154(b) by 0 days.

(21) Appl. No.: 09/520,374

(22) Filed: Mar. 6, 2000

Related U.S. Application Data

(60) Provisional application No. 60/123,683, filed on Mar. 9, 1999.

(51) Int. Cl.$^7$ .............................................. G06K 9/100
(52) U.S. Cl. .................. 382/128; 250/326; 600/407; 607/56
(58) Field of Search ................................ 382/100, 126, 382/129–134, 110, 181, 218; 250/324–326; 361/232–233; 600/407, 410, 409, 300; 607/1, 100, 56, 101, 50; 128/920, 923, 731–732; 396/14, 661, 429

(56) References Cited

U.S. PATENT DOCUMENTS

| | | | | |
|---|---|---|---|---|
| 3,994,283 A | | 11/1976 | Farley | 600/300 |
| 4,195,641 A | | 4/1980 | Joines et al. | 600/346 |
| 4,222,658 A | | 9/1980 | Mandel | 396/14 |
| 4,386,834 A | | 6/1983 | Toolan | 395/661 |
| 4,542,969 A | | 9/1985 | Omura | 396/661 |
| 4,679,924 A | | 7/1987 | Wamsley | 396/4 |
| 4,746,213 A | | 5/1988 | Knapp | 356/311 |
| 5,024,235 A | * | 6/1991 | Ayers | 128/732 |
| 5,132,714 A | * | 7/1992 | Samon | 396/429 |
| 5,208,453 A | | 5/1993 | Hostetler | 250/214 LA |
| 5,720,619 A | * | 2/1998 | Fisslinger | 434/336 |
| 5,844,406 A | | 12/1998 | Gormley et al. | 324/71.3 |
| 6,016,540 A | | 1/2000 | Crock | 712/214 |

OTHER PUBLICATIONS

Soultanov et al., "Instant Kirlian Diagnostic System (IKIDS)", 2nd International Conference on Bioelectromagnetism, IEEE, Feb. 1998, pp. 147–148.*

Rajyaguru et al., "X–ray Microscopy and Biomedical Specimens", University of Central Florida, IEEE 1998, pp. 46–47.*

Koufas et al., "A Biosensor to Monitor Waterborne Pathogens", University of Connecticut, IEEE 1998, pp. 12–14.*

* cited by examiner

Primary Examiner—Jayanti K. Patel

(57) ABSTRACT

An aura detection system for detecting pathogens through the detection of a specific aura signature of the pathogen or a creature carrying the pathogen. The system includes a transmitter for generating high frequency waves to produce an electrical field, the transmitter including generating means for generating a high frequency electrical field, a receiver for monitoring the high frequency electrical field generated by the transmitter, and a processor for processing the signals from the antenna array of the receiver. The transmitter and the receiver are spaced with a space therebetween for receiving an organism. The invention also includes a method of detecting pathogens includes providing an aura detection device for detecting an aura of an organism, creating a high frequency electrical field to reveal an aura of an organism in the electrical field, placing a subject organism in the electrical field, detecting by the aura detection device an aura signature of the subject organism in the field, comparing the detected aura signature of the subject organism to aura signatures of known organisms, and identifying any organisms having an aura signature corresponding to any portion of the detected aura signature of the subject organism.

13 Claims, 5 Drawing Sheets

APPARATUS AND METHOD FOR DETECTING AND IDENTIFYING ORGANISMS, ESPECIALLY PATHOGENS, USING THE AURA SIGNATURE OF THE ORGANISM

CROSS REFERENCE TO RELATED APPLICATION

This application claims the benefit of U.S. Provisional Application No. 60/123,683, filed Mar. 9, 1999.

BACKGROUND OF THE INVENTION

1. Field of the Invention

This invention relates to technology to systems for detecting pathogens, and more particularly to systems for detecting pathogens through the detection of a specific aura signature of the pathogen or a creature carrying the pathogen.

2. Description of the Prior Art

"Auras" are electromagnetic fields created by the action of the cells of all living organisms. Devices have been developed that detect and display the auras created by living organisms. Such devices have been referred to as corona discharge photography devices, but are more commonly known as Kirlian photography devices. Typically, the aura is revealed by generating a high frequency, high voltage, low current electrical field through and around an organism. The generated field causes the electromagnetic field around a living organism to vibrate at specific frequencies and amplify the field, similar to a living antenna. The Kirlian photography device displays the detected aura as colored fields of light on a display, with different colors corresponding to different frequencies in the aura.

One example of such is a device has been produced by the Progen Co. of Redwood City, Calif., and is known as the Aura 3000 Aura Imaging Photography camera. This device uses traditional biofeedback measurement techniques, combined with high-voltage field imaging.

So far as is known, the use of the aura detection devices has been as a novelty. Such devices have been used, for example, in detecting the auras of persons for the purpose of interpreting the moods and personalities of persons. For people, the color, shape and size of an aura can change slightly depending on mood as a result of brain activity. Each living organism is believed to have a unique aura. Some experiments with auras have been done on leaves, and an oak leaf, generates a different aura from a maple leaf.

One indication of the health of a person in an aura is striations of silvery lines extending from the body. Strong bright lines indicate good health. However, it has been found that the auras of diseased persons display anomalies not present in relatively healthy persons. Typically, the auras of diseased persons bear telltale colors, and the auras may have holes or gaps not normally present in healthy persons. An illness can often be detected as a dark brown glow in a person's aura. As the brown glow becomes more intense, the onset of the illness also gets closer. At the same time, the aura will start to show holes in it that indicate the presence of illness. Further, dull, metal-gray and droopy lines close to the body indicate ill health, sometimes even before a person realizes it. In addition, the shape of an aura can become unbalanced during illness.

While the art has witnessed new and further developed uses and utilizations of Kirlian photography, most of the known uses have been directed to detecting and analyzing the condition of the human body, and even attempting to cure illnesses in the human body through Kirlian photography.

Various Kirlian photography devices and uses thereof have been described in U.S. Pat. Nos. 3,994,283; 4,195,641; 4,222,658; 4,386,834; 4,542,969; 4,679,924; 4,746,213; 5,208,453; 5,844,406; and 6,016,450.

While these devices fulfill their respective, particular objectives and requirements, the aforementioned patents do not disclose a new apparatus and method for detecting and identifying organisms, especially pathogens, using the aura signature of the pathogens in real-time.

Epidemics, either naturally occurring or caused by the use of biological warfare agents for a militaristic or terroristic purpose, necessarily involve the presence of pathogens to transmit the diseases. Pathogens are living organisms that also have distinctive auras. However, detection of pathogens generally requires laboratory testing of samples that is time consuming and generally requires invasive, contact based procedures that are not practical for large scale practice on large populations of persons.

SUMMARY OF THE INVENTION

In view of the foregoing limited uses of the Kirlian photography present in the known in the prior art, the present invention provides a new apparatus and method for detecting organisms such as pathogens in real-time wherein the same can be utilized for detecting pathogens through the detection of a specific aura signature of the pathogen or a creature carrying the pathogen.

The general purpose of the present invention, which will be described subsequently in greater detail, is to provide a new apparatus and method for detecting organisms such as pathogens in real-time. To attain this, the present invention generally comprises an aura detection system for detecting the presence of pathogens which includes a transmitter for generating high frequency waves to produce an electrical field, the transmitter including generating means for generating a high frequency electrical field, a receiver for monitoring the high frequency electrical field generated by the transmitter, and a processor for processing the signals from the antenna array of the receiver. The transmitter and the receiver are spaced with a space therebetween for receiving an organism. The invention also includes a method of detecting pathogens includes providing an aura detection device for detecting an aura of an organism, creating a high frequency electrical field to reveal an aura of an organism in the electrical field, placing a subject organism in the electrical field, detecting by the aura detection device an aura signature of the subject organism in the field, comparing the detected aura signature of the subject organism to aura signatures of known organisms, and identifying any organisms having an aura signature corresponding to any portion of the detected aura signature of the subject organism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new apparatus and method for detecting organisms such as pathogens in real-time, especially an apparatus that may be made easily portable for spot testing in various places for short or extended periods of time.

Yet another object of the present invention is to provide a new apparatus and method for detecting organisms such as pathogens in real-time that permits detection and identification of various organisms without requiring personnel to come into direct contact with samples possibly containing pathogens and bacteria and viruses, and creating samples that must be properly disposed as biohazard material.

Still yet another object of the present invention is to provide a new pathogen detector to apparatus and method for detecting organisms such as pathogens in real-time that detects and identifies pathogen-based illnesses on location, with no need to transport samples to a distant lab. The cost of detection, once the equipment is manufactured, purchased, and installed, would be minimal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
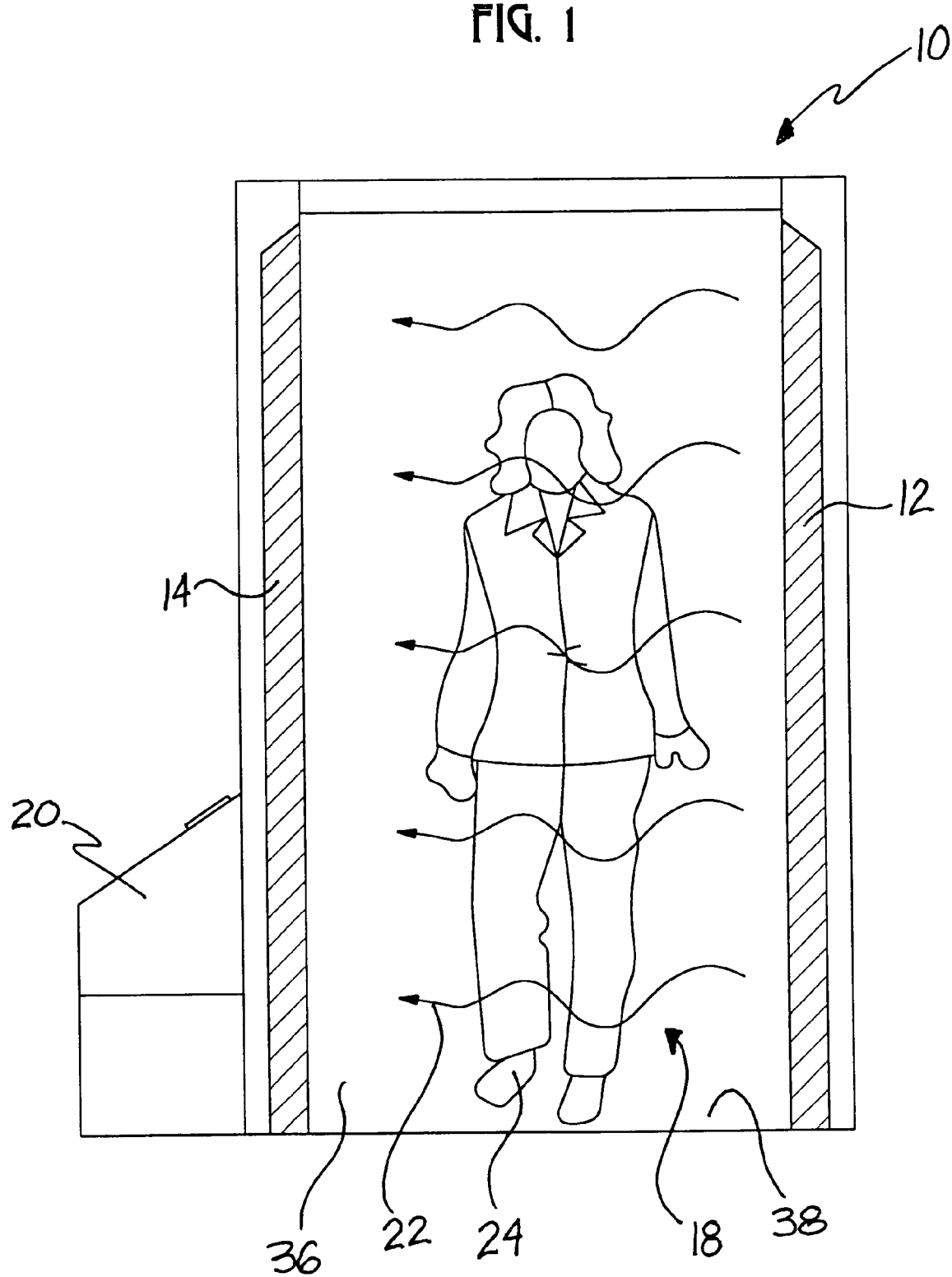
FIG. 1 is a schematic front view of a new apparatus for detecting organisms such as pathogens in real-time according to the present invention.
Figure 2:
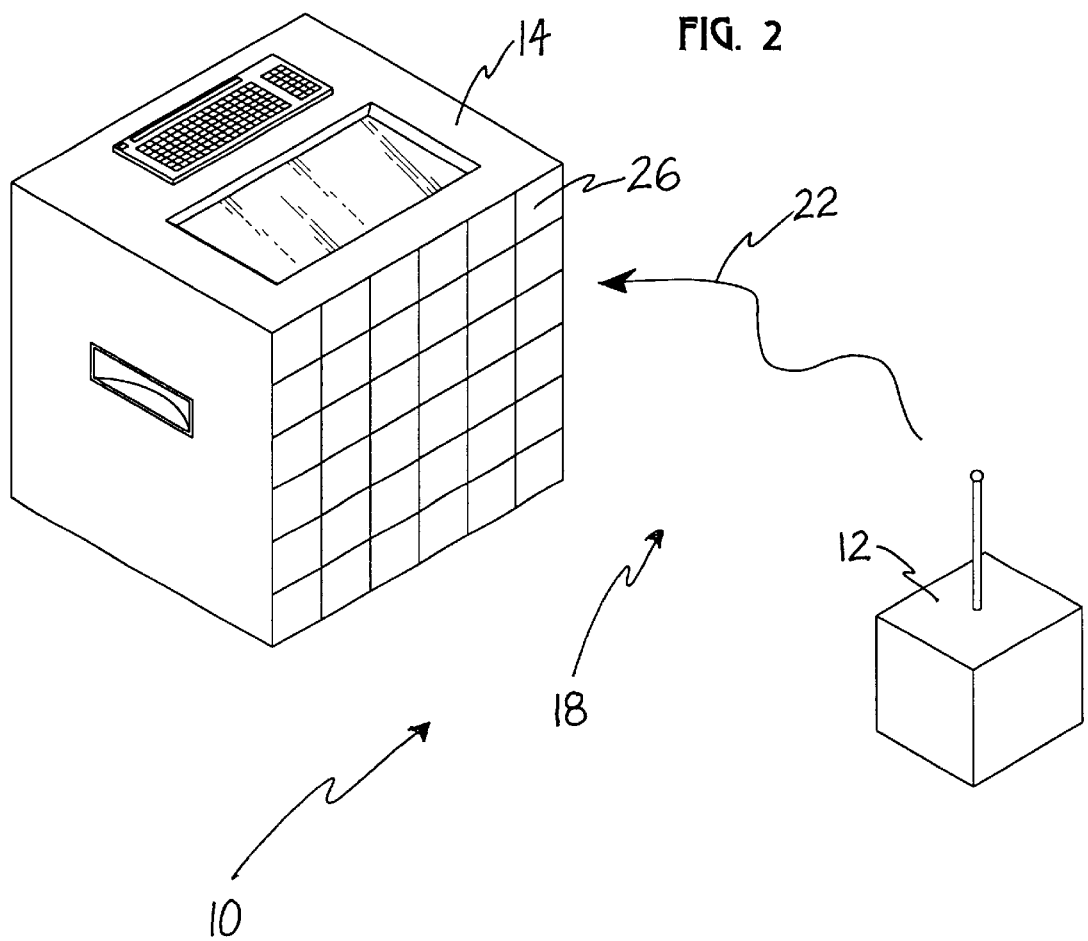
FIG. 2 is a schematic perspective side view of a more portable embodiment of the apparatus for detecting organisms of the present invention.
Figure 3:
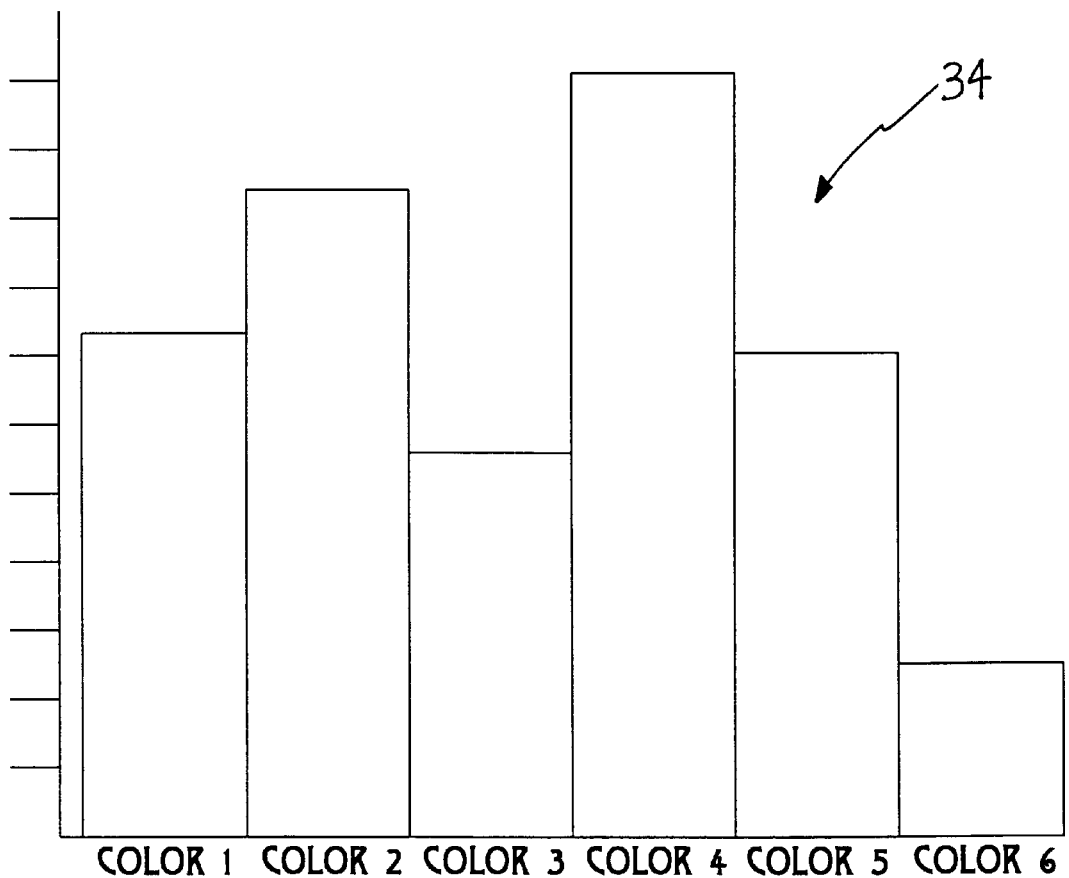
FIG. 3 is a schematic view of a graph of a display of the present invention showing the bars representing the magnitudes of various colors of the aura signature of an organism.
Figure 4:
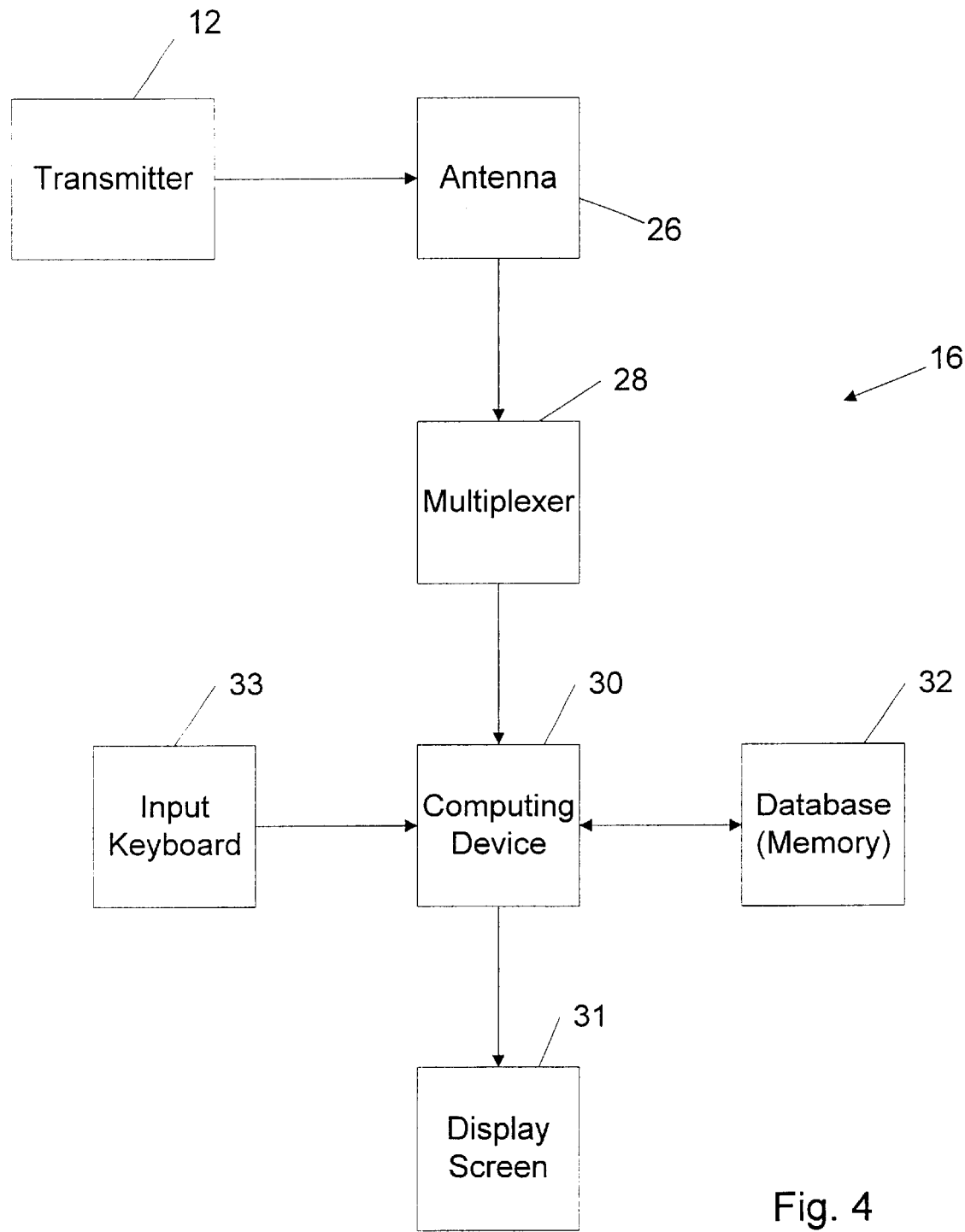
FIG. 4 is a schematic diagram of the system of the present invention.
Figure 5:
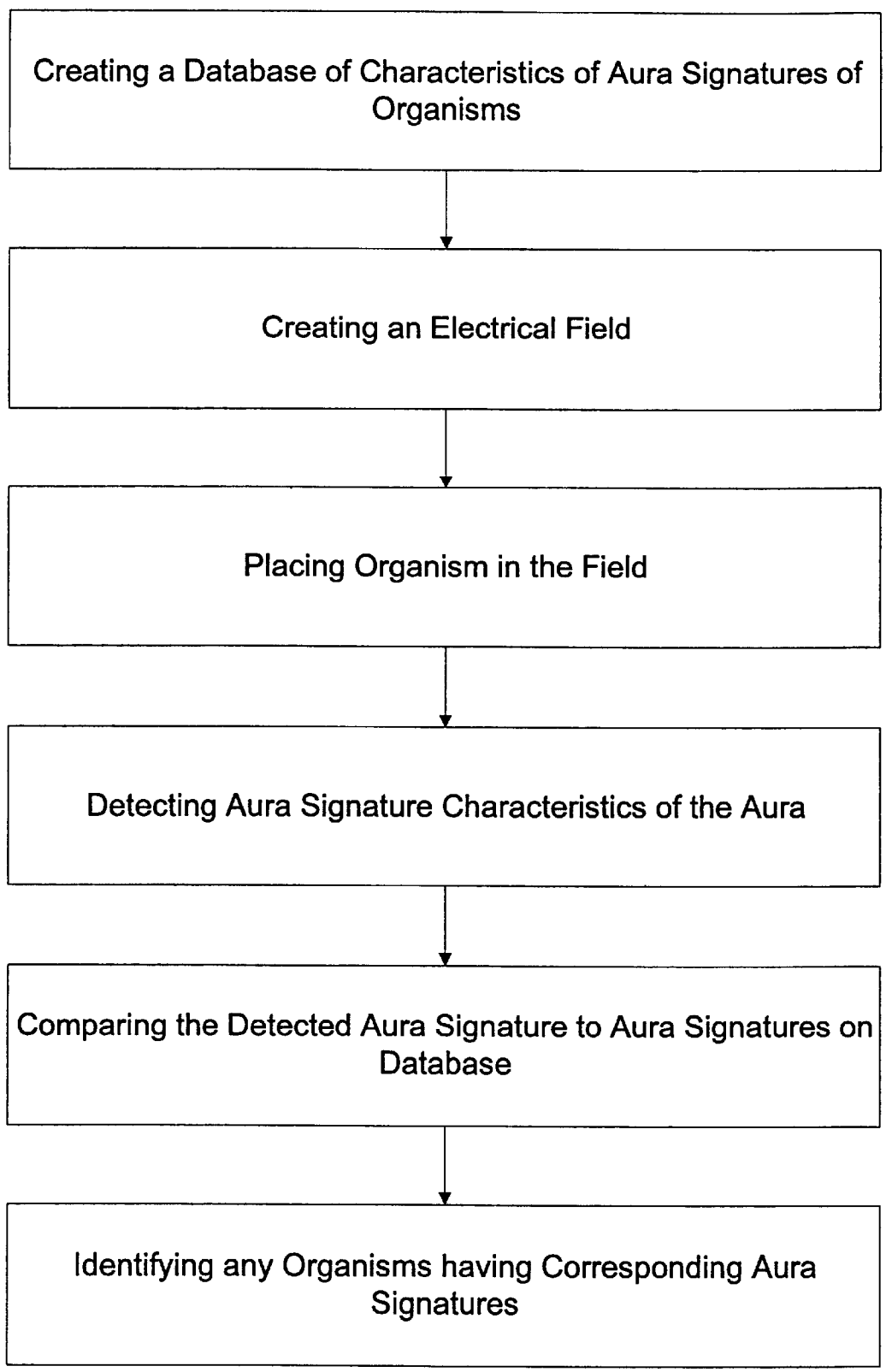
FIG. 5 is a schematic flow diagram of the method associated with the invention.

With reference now to the drawings, and in particular to FIGS. 1 through 5 thereof, a new apparatus and method for detecting organisms such as pathogens in real-time embodying the principles and concepts of the present invention and generally designated by the reference numeral 10 will be described.

One aspect of the invention comprises a new apparatus for detecting organisms, especially pathogens, in other organisms or even in open spaces. The aura detection device for detecting and analyzing for identification the auras of living organisms, especially pathogens.

The apparatus includes a device for creating a high frequency electrical field to reveal an aura of an organism passing through the electrical field. The aura detection device may comprise a transmitter 12, a receiver 14, and a processing means 16.

The transmitter is provided for generating high frequency waves to produce an electrical field 18. The transmitter of the aura detection device comprises generating means for generating a high frequency electrical field. Illustratively, the transmitter (see FIG. 1) includes a housing 20 which contains other components of the transmitter. A radio transmitter may be used to transmit the high frequency radio waves 22 that create an electrical field and which pass through and around a living organism (such as a human 24) to make the constituent parts of the organism vibrate.

The receiver 14 is provided for monitoring the high frequency electrical field transmitted by the transmitter. The receiver of the aura detection device preferably may comprise an array 26 of antennas arranged in a grid. The high frequency radio waves strike the antennae grid, and processing means process the signals from the antenna array of the receiver.

The processing means 16 includes a multiplexer 28 for processing the signals from the antenna array. The receiver equipment inside the housing produces signals representing the aura of an organism in the field produced by the transmitter. The high-speed multiplexer then converts the electrical signals into digital signals. The processing means includes a computing device 30 for comparing signals received from the receiver to information stored in a database 32, such as may be maintained in a computer. Software in the accompanying computer can then match the aura signature characteristics, such as a bar graph 34, with known bar graphs stored in memory of the database for different viruses. A match can be identified on the computer screen 31, indicating the presence or absence of a virus or bacteria. The computing device also may identify the specific virus or bacteria involved based upon any match detected. An input keyboard 33 may also be included for communicating with the computing device.

The transmitter and the receiver may be spaced from each other with a space 36 therebetween in which the field is created for receiving an organism to be analyzed. Preferably, a path 38 passes through the space with the field to permit humans 24 to move through the space and come under the influence of the field.

Another significant aspect of the invention is a method of creating a reference database of aura signatures of organisms, especially known pathogens, for comparison of the aura signatures of subject organisms in the field of the device to the aura signatures saved in the database.

The process of creating the database of aura signatures includes placing an organism in the electrical field of the device. In the most preferred embodiment of the invention, the organism comprises a known pathogen that is placed in the field. A plurality of characteristics of an aura of the organism are detected and measured to create an aura signature. The aura signature may include a plurality of characteristics of an aura. One of the characteristics detected and measured may be the frequencies present in the aura of the organism. The frequencies of the aura may correspond to a plurality of colors in the aura. Another characteristic of the aura that may be detected and measured is the shape of the aura. A further characteristic of the aura that may be detected and measured may be the relative size of the aura. Other characteristics of the aura may be also be detected and measured.

The characteristics of the aura signature of the organism may be recorded in a database. The colors of the aura signatures are preferably recorded as a plurality of bars. Each bar may represent one color of the detected aura. A length of the bar preferably represents a magnitude of the color (or frequency) detected in the aura of the organism.

For determining the presence of an organism, such as a pathogen, in a subject organism, the subject organism is passed through the field of the aura detection device. Optionally, if a space is being swept for the presence of a pathogen, the device may be moved with respect to the space such that an area of space is moved through the field created by the device.

The aura signature of the subject organism is detected, utilizing the same or similar aura characteristics that are stored in the database for the organisms recorded in the database.

The aura of the subject organism may be displayed in real time on a display, such as screen formed of a cathode ray tube or liquid crystal display. The display may include a visual representation of the spatial arrangement of the detected aura of the subject organism in the field, and may include representations of the colors of the field. The display may include a plurality of bars, such as in a graphical format (see FIG. 2), with each bar representing one color of the detected aura and each bar having a length that represents a magnitude of the color in the detected aura of the subject organism.

The detected aura signature of the subject organism is compared to the characteristics of the aura signatures of known organisms, such as those aura signatures recorded on the database of known organisms. Ideally, the known organisms comprise pathogens, but optionally may include other organisms whose detection might be desirable. Illustratively, software adapted for comparing specific characteristics, features and specific points of comparison may be used. One example of analogous comparison software is the software that is employed to compare and match fingerprints to fingerprints stored on a database. One example of such software is the Integrated Automated Fingerprint Identification System (IAFIS) developed by the Lockheed Martin Corporation for use by the Federal Bureau of Investigation and other law enforcement agencies. Several similar automated fingerprint identification systems are also believed to be available. The IAFIS uses software that identifies specific fingerprints with algorithms that compare spatial relationships and ink shading between key points of a fingerprint. This function may be adapted to the characteristics of an aura.

The comparison of the aura signatures may produce a match, and permit an identification of any pathogens having an aura signature corresponding to any portion of the detected aura signature of the subject organism. The name of any pathogen having an aura signature detected in the aura signature of the subject organism may be displayed on the display, preferably in real time as the person moves through the device or shortly after.

The invention has numerous benefits, including a low cost of operation since no single-use chemicals or a laboratory is needed, and as few as one person would be needed to monitor a video screen for the presence of pathogens Further, the portability of the equipment and the database would allow a search of pathogens such as viruses and bacteria in places not usually searched, in remote areas, and in places where many people are present who could be carrying pathogens.

Advantageously, the equipment could easily be adapted for military or police use to inspect large areas for the presence of biological weapons. Several pathogen detectors could be arrayed to form an interferometer, thereby inspecting a larger area within moments than could be inspected with a single device.

Still further, lethal viruses used for biological terrorism could be quickly identified, contained and destroyed. In addition, if anyone is infected, they could be treated quickly to prevent their deaths or disability. Currently, for example, victims of anthrax typically show no symptoms they are carrying the virus until two days after exposure. By then, it is too late to save them from painful deaths. If, however, the virus could be detected early through aura examination, it could either be contained before anyone is infected or infected people could be treated early, while they can still make a complete recovery after injections of penicillin or similar drugs.

Also, the invention may be used for detecting $E.\ coli$, botulism or other pathogens in food. The food may be moved through a device having a conveyor belt. If diseased microbes were detected in the food, their auras could be identified immediately in real-time and all infected food discarded. This would eliminate the need for spot inspections of a few samples, which could overlook some infected foods. Instead, all the food could be inspected and at the minimal cost of a conveyor belt and a device for examining the auras. Similar techniques could be used in municipal water supply pipes to ensure water quality, or in building vents to monitor air quality and avoid sick building syndrome.

The movement of epidemics may also be studied. Rather than waiting until people are infected and tracking patterns in the spread of the disease, the invention allows proactive action to prevent people from getting sick before anyone contracts diseases.

Mass transportation organizations, such as airlines, may use the invention to exclude infected people from entering airplanes and spreading disease. Currently, risk of disease is becoming a significant issue in air, rail and bus travel because of pathogens often carried by other passengers in close proximity.

Hospitals could prevent spread of infection to patients. As viruses become increasingly resistant to disinfectants and medicines, the risk of contracting illnesses in hospitals is growing. With this technology, hospital personnel could detect a spreading pathogen quickly, if not immediately, in real-time, and take action to counteract it.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of detecting pathogens, comprising:
providing an aura detection device for detecting an aura of an organism; wherein aura detection device comprising a transmitter for generating high frequency waves to produce an electrical field, a receiver for monitoring high frequency electrical field transmitted by the transmitter, and processing means for processing signals from an antenna array of the receiver
creating a high frequency electrical field to reveal an aura of an organism in the electrical field;
placing a subject organism in the electrical field;
detecting by the aura detection device an aura signature of the subject organism in the field;
comparing the detected aura signature of the subject organism to aura signatures of known organisms; and
identifying any organisms having an aura signature corresponding to any portion of the detected aura signature of the subject organism.

2. The method of claim 1 additionally comprising spacing the transmitter from the receiver such that a path is formed therebetween to permit humans to move through the space.

3. The method of claim 1 additionally comprising creating a database of aura signatures of organisms.

4. The method of claim additionally comprising placing an organism in the electrical field, detecting a plurality of characteristics of an aura of the organism to create an aura signature, recording an aura signature of the organism.

5. The method of claim 4 additionally comprising including in the aura signature the characteristics of the frequencies of the detected aura of the organism, the shape of the detected aura of the organism, and the size of the detected aura of the organism.

6. The method of claim 4 additionally comprising recording the characteristics of the aura signature on the a database.

7. The method of claim 6 wherein the recording step includes recording the aura signature as a plurality of bars with each bar representing one color of the detected aura and a length of the bar representing a magnitude of the color in the detected aura of the organism.

8. The method of claim 1 additionally comprising displaying the aura of the subject organism in real time on a display.

9. The method of claim 8 wherein the displaying step includes displaying a visual representation of the spatial arrangement of the detected aura of the subject organism in the field.

10. The method of claim 8 wherein the displaying step includes displaying a plurality of bars with each bar representing one color of the detected aura and a length of the bar representing a magnitude of the color in the detected aura of the subject organism.

11. The method of claim 1 additionally comprising displaying a name of any pathogen having an aura signature corresponding to a portion of the aura signature detected for the subject organism.

12. The method of claim 1 additionally comprising recording the aura signatures of pathogens on the database.

13. A method of detecting pathogens, comprising:
providing an aura detection device, the aura detection device comprising:
a transmitter for generating high frequency waves to produce an electrical field, the transmitter of the aura detection device comprising generating means for generating a high frequency electrical field;
a receiver for monitoring the high frequency electrical field transmitted by the transmitter, the receiver of the aura detection device comprising an array of antennas arranged in a grid, the array producing signals representing the aura of an organism in the field produced by the transmitter;
processing means for processing the signals from the antenna array of the receiver, a multiplexer for processing the signals from the antenna array, the processing means comprising a computing device for comparing signals received from the receiver to information stored in a database;
wherein the transmitter and the receiver are spaced with a space therebetween for receiving an organism, wherein a path passes through the space to permit humans to move through the space;
creating a high frequency electrical field to reveal an aura of an organism passing through the electrical field;
creating a database of aura signatures comprising:
placing an organism in the electrical field, wherein the organism comprises a known pathogen;
detecting a plurality of characteristics of an aura of the organism to create an aura signature, wherein the aura signature includes the characteristics of:
the frequencies of the detected aura of the organism, the frequencies corresponding to a plurality of colors,
the shape of the detected aura of the organism,
the size of the detected aura of the organism;
recording an aura signature of the organism, wherein the characteristics of the aura signature are recorded in a database, wherein the colors of the aura signatures are recorded as a plurality of bars with each bar representing one color of the detected aura and a length of the bar representing a magnitude of the color in the detected aura of the organism;
passing a subject organism through the field of the aura detection device;
detecting an aura signature of the subject organism in the field;
displaying the aura of the subject organism in real time on a display, wherein the display includes a visual representation of the spatial arrangement of the detected aura of the subject organism in the field, wherein the display includes a plurality of bars with each bar representing one color of the detected aura and a length of the bar representing a magnitude of the color in the detected aura of the subject organism;
comparing the detected aura signature of the subject organism to aura signatures of known organisms, wherein the known organisms comprise pathogens, wherein the aura signatures of known pathogens are recorded on a database;
identifying any pathogens having an aura signature corresponding to any portion of the detected aura signature of the subject organism, displaying the name of any pathogen having an aura signature detected in the aura signature of the subject organism.

* * * * *